(12) United States Patent
Eber

(10) Patent No.: US 8,562,486 B1
(45) Date of Patent: Oct. 22, 2013

(54) AUTOMATIC TRANSMISSION WITH DUAL OFFGOING CLUTCHES

(71) Applicant: GM Global Technology Operations LLC, Detroit, MI (US)

(72) Inventor: Kelly E Eber, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/676,154

(22) Filed: Nov. 14, 2012

(51) Int. Cl.
*B60W 10/02* (2006.01)
*B60W 10/04* (2006.01)

(52) U.S. Cl.
USPC .............................. 477/176; 477/79; 477/180

(58) Field of Classification Search
USPC .............. 475/70, 79, 86, 166, 174, 176, 180, 475/269–330
See application file for complete search history.

(56) References Cited

U.S. PATENT DOCUMENTS

2010/0331138 A1* 12/2010 Phillips .......................... 475/278
2012/0270694 A1* 10/2012 Seo et al. ....................... 475/276
2012/0302393 A1* 11/2012 Seo et al. ....................... 475/276

* cited by examiner

*Primary Examiner* — Justin Holmes
(74) *Attorney, Agent, or Firm* — Quinn Law Group, PLLC

(57) ABSTRACT

A vehicle includes an engine and transmission. A first rotating clutch engages as an oncoming clutch during a predetermined shift maneuver having a total required clutch energy. A second rotating clutch acts as a holding clutch. A third rotating clutch engages as an additional oncoming clutch during the shift maneuver to share clutch energy with the first rotating clutch. The third rotating clutch, when not engaged, has a zero slip speed relative to the input member. A method includes building a shift table for a transmission design, including identifying slip speed ratios, with respect to the input member, for each clutch, and selecting, from the shift table, a direct drive or other gear state in which three of the rotating clutches are simultaneously operating at a zero slip speed ratio with respect to the input member. The third rotating clutch engages during the shift maneuver.

19 Claims, 2 Drawing Sheets

|         | R  | 1 | 2  | 3  | 4  | 5  | 6  | 7  | 8  | 9  | 10 |
|---------|----|----|----|----|----|----|----|----|----|----|----|
| CB123456| R  | 0 | 0  | 0  | 0  | 0  | 0  | -R | -R | -R | -R |
| CB29    | -R | R | 0  | -R | -R | -R | -R | -R | -R | 0  | -R |
| CB1R    | 0  | 0 | -R | -R | -R | -R | -R | -R | -R | -R | -R |
| C5710R  | 0  | R | R  | R  | R  | 0  | -R | 0  | R  | R  | 0  |
| C6789   | R  | R | R  | R  | R  | R  | 0  | 0  | 0  | 0  | -R |
| CB3810  | -R | R | R  | 0  | -R | R  | -R | -R | 0  | R  | 0  |
| C4*     | -R | R | R  | R  | 0  | -R | -R | 0  | R  | R  | R  |

US 8,562,486 B1

AUTOMATIC TRANSMISSION WITH DUAL OFFGOING CLUTCHES

TECHNICAL FIELD

The disclosure relates to an automatic transmission with dual offgoing clutches.

BACKGROUND

A motor vehicle transmission typically uses interconnected gear elements and clutches to couple transmission input and output members, and to thereby establish a desired speed ratio. Shifting between gears of the transmission is achieved automatically in response to engine throttle level and vehicle speed, and generally involves releasing a clutch associated with the current speed ratio, i.e., the offgoing clutch, and applying a clutch associated with a desired new speed ratio, i.e., the oncoming clutch. A shift made to a lower and a higher speed ratio is referred to as an upshift and a downshift, respectively.

Conventional transmissions are designed with compliance devices such as accumulators, wave plates, springs, and orifices. These compliance devices collectively control the dynamics of the shift event. Additionally, the construction of each of the various clutches used in the transmission is based largely on the clutch energy required by each clutch in the execution of a given shift event. Particular attention is paid to whether the clutch acts as an oncoming clutch or a holding clutch in a given shift maneuver.

SUMMARY

A transmission is disclosed herein having dual oncoming clutches. Required oncoming clutch energy is reduced relative to existing transmissions. In the present transmission, a mode exists in which the application of any two of three different clutches results in the common rotation of all nodes of multiple planetary gear sets, i.e., all nodes rotate at the same speed. For instance, in an example embodiment the transmission may be a 10-speed transmission that includes four planetary gear sets each having three nodes. One gear state, e.g., $7^{th}$ gear, may be a direct drive gear in which all of the nodes rotate at a common speed.

In this particular example, a clutch that is not normally engaged in $7^{th}$ gear may be designated as an additional oncoming clutch, and selectively engaged as one of two oncoming clutches in a 6-7 upshift so as to reduce the energy requirements of the other oncoming clutch, which otherwise would act as the sole oncoming clutch in this maneuver. The present design may reduce spin losses in the transmission, as well as reduced the cost, mass, and required packaging space due to the reduction in size of the other oncoming clutch. For every unit of energy absorbed by the designated additional oncoming clutch, the required clutch energy for the other oncoming clutch may be reduced by one unit.

A vehicle is disclosed herein that includes an engine and a transmission. The transmission includes a plurality of gear sets, rotating clutches, braking clutches, and input member, and an output member. The rotating clutches include a first rotating clutch engaged as an oncoming clutch during execution of a predetermined shift maneuver, and a second rotating clutch. The shift maneuver has a total required clutch energy. The second rotating clutch is engaged as a holding clutch during execution of the predetermined shift maneuver.

The gear sets are selectively connected to and disconnected from each other via actuation of different ones of the rotating and braking clutches, alone or in combination, to thereby establish multiple forward drive states of the transmission. The input member connected to the engine and to a node of at least one of the plurality of gear sets. The output member is connected to a node of a different one of the plurality gear sets. The rotating clutches also include a third rotating clutch that, when not engaged, has a zero slip speed relative to the input member during the predetermined shift maneuver, and wherein the third clutch is designated as an additional oncoming clutch that is engaged during the predetermined shift maneuver to share the total required clutch energy with the first clutch.

A method includes providing a preliminary transmission design having a plurality of gear sets, rotating clutches including a first rotating clutch that is engaged as an oncoming clutch during execution of a predetermined shift maneuver having a total required clutch energy, and a second rotating clutch engaged as a holding clutch during execution of the predetermined shift maneuver. The transmission also includes an input member and an output member. The method includes building a shift table for the transmission design, including identifying the slip speed ratios, with respect to the input member, for each of the plurality of clutches, wherein the shift table is indexed by every available forward and reverse drive state for each of the rotating clutches and each of the braking clutches.

The method also includes selecting, from the shift table, a direct drive or other gear state in which three of the rotating clutches are simultaneously operating at a zero slip speed ratio with respect to the input member. Thereafter, the method includes designating a third rotating clutch of the plurality of rotating clutches as an additional oncoming clutch for application during the predetermined shift maneuver, wherein the designated additional oncoming clutch has a zero slip speed and is not otherwise engaged during the predetermined shift maneuver. A transmission is constructed having the first and third rotating clutches as oncoming clutches for the predetermined shift maneuver. The third rotating clutch is engaged during the predetermined shift maneuver to thereby share the total required clutch energy with the first rotating clutch.

The above features and the advantages of the present disclosure are readily apparent from the following detailed description of the best modes for carrying out the invention when taken in connection with the accompanying drawings.

DETAILED DESCRIPTION

Figure 1:
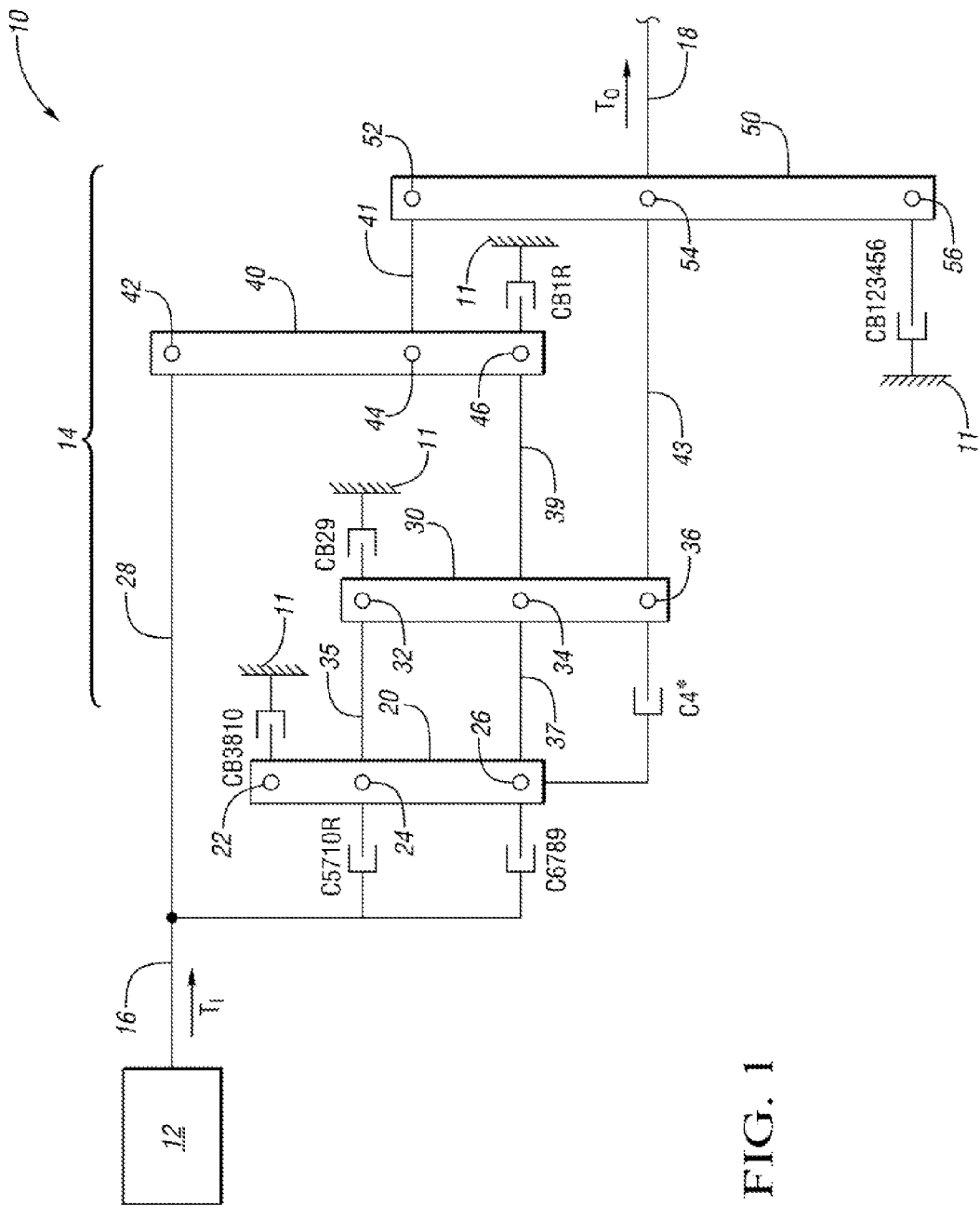
FIG. 1 is a schematic illustration of an example vehicle having an automatic transmission designed with reduced clutch torque energy using the method set forth herein.

Referring to the drawings, an example vehicle 10 is shown schematically in FIG. 1 having an internal combustion engine 12 and a transmission 14. The transmission 14 is shown as a schematic lever diagram, as will be understood by those having ordinary skill in the art. The transmission 14 includes an input member 16 and output member 18, which are selectively connected to each other at a desired speed ration via a plurality of gear sets. In the example embodiment of FIG. 1, the transmission 14 is a 10-speed automatic transmission having four planetary gear sets, i.e., a first gear set 20, a second gear set 30, a third gear set 40, and a fourth gear set 50. Input torque (arrow $T_I$) from the engine 12 or another prime mover, e.g., an electric traction motor, is transferred via the transmission 14 such that output torque (arrow $T_O$) is ultimately transferred to the output member 18.

As described below with reference to FIGS. 2 and 3, the transmission 14 is designed such that the application of any two of three clutches results in a direct drive or other drive mode wherein all nodes of the multiple gear sets 20, 30, 40, and 50 rotate at a common speed. Identification of the particular clutch that is not normally engaged while entering such a drive mode allows the identified clutch to be used as an additional oncoming clutch in that particular mode, thereby absorbing clutch energy from the second of the two oncoming clutches.

Thus, the required clutch energy for the other oncoming clutch may be reduced by one unit of energy for every unit of energy absorbed by the designated additional oncoming clutch. The present design is described herein using the example transmission 14 of FIG. 1, which as noted above is a 10-speed transmission having four planetary gear sets and seven clutches, including three rotating clutches C4*, C6789, and C5710R, and four braking clutches CB1R, CB123456, CB29, and CB3810, the nomenclature for which is described below. However, those of ordinary skill in the art will recognize the applicability of the present approach to other transmission designs having more or fewer gear sets/forward drive gears.

The first gear set 20 of FIG. 1 includes first, second, and third nodes 22, 24, and 26, respectively. The second, third, and fourth gear sets 30, 40, and 50 likewise have respective first, second, and third nodes. For the second gear set 30, the first, second, and third nodes are nodes 32, 34, and 36, respectively. For the third gear set 40, these are nodes 42, 44, and 46, respectively. The fourth gear set 50 has respective first, second, and third nodes 52, 54, and 56.

With respect to the first gear set 20, the first node 22 is selectively connected to a stationary member 11 via the braking clutch CB3810. The second node 24 is selectively connected to the engine 12 via the rotating clutch C5710R. Likewise, the third node 36 is selectively connected to the engine 12 via rotating clutch C6789. As used hereinafter for all clutches, the letter "C" refers to "clutch", "B" refers to "brake", and the various numbers refer to the particular forward drive gear modes, e.g., "R" is reverse, "1" is $1^{st}$ gear, "2" represents $2^{nd}$ gear, etc., all the way up to $10^{th}$ gear. The absence of a "B" in the clutch designation indicates that the particular clutch is a rotating clutch. The asterisk (*) represents the designated additional oncoming clutch in the example embodiment described with reference to FIGS. 2 and 3.

With respect to the second gear set 30, the first node 32 is continuously connected to the second node 24 of the first gear set 20 via a first interconnecting member 35. The first node 32 is also selectively connected to the stationary member 11 via the braking clutch CB29. The second gear set 30 is also continuously connected to the first gear set 20 via a second interconnecting member 37. Interconnecting member 37 connects the second node 34 of the second gear set 30 to the third node 26 of the first gear set 20. Rotating clutch C4* selectively connects the respective third nodes 26 and 36 of the first and second gear sets 20 and 30.

Still referring to FIG. 1, a third interconnecting member 28 continuously connects the input member 16 to the first node 42 of the third gear set 40. Likewise, a fourth interconnecting member 41 connects the second node 44 of the third gear set 40 the first node 52 of the fourth gear set 50. A fifth interconnecting member 43 connects the third node 36 of the second gear set 30 to the second node 54 of the fourth gear set 50. A sixth interconnecting member 39 connects the second node 34 of the second gear set 30 to the third node 46 of the fourth gear set 50. The third node 56 of the fourth gear set 50 is selectively connected to the stationary member 11 via a braking clutch CB123456, with the output member 18 of the transmission being continuously connected to the second node 54 of the same gear set. Thus, the second node 54 of the fourth gear set 50 delivers output torque (arrow $T_O$) for powering the vehicle 10.

In an example embodiment, the first nodes 22, 32, 42, second nodes 24, 34, 44, and third nodes 26, 36, 46 of each of the first, second, and third gear sets 20, 30, and 40 may be a sun gear, a carrier, and a ring gear, respectively. In such an embodiment, the first, second, and third nodes 52, 54, 56 of the fourth gear set 50 may be a respective ring gear, carrier, and sun gear. Other configurations may be used without departing from the intended inventive scope.

Figures 2, 3:
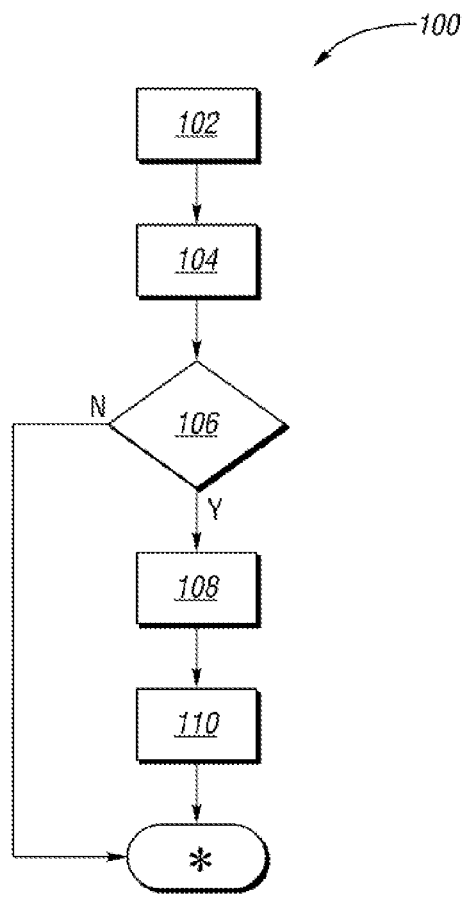
FIG. 2 is an example table of representative clutch element slip ratios in various gears of the transmission shown in FIG. 1.
FIG. 3 is a flow chart describing an example method for designing a transmission with reduced clutch energy relative to conventional designs.

Referring to FIG. 2, a shift table 60 is shown that illustrates example slip speed ratios R, −R, and 0 achieved for each drive state of the transmission 14 of FIG. 1, i.e., reverse (R) and $1^{st}$ through $10^{th}$ gears 1-10, respectively. In the example transmission 14 of FIG. 1, the rotating clutch C5710R would typically act as the sole oncoming clutch in a 6-7 upshift, and rotating clutch C6789 would typically act as the sole holding clutch. These roles may be reversed in an alternative embodiment, with clutch C6789 thus acting as the oncoming clutch and clutch C5710R acting as the holding clutch. Rotating clutch C4* is typically inactive during the 6-7 upshift. Note that only in $7^{th}$ gear do three different clutches simultaneously operate at a zero slip speed. This state is indicated by region 62 of FIG. 2.

Referring to FIG. 3, a method 100 may be used to optimize the design of a transmission, e.g., the transmission 14 of FIG. 1, such that the resultant configuration has reduced clutch energy relative to the existing transmission design. As part of the execution of the method 100 shown in FIG. 3 the unique zero slip speed state (region 62 of FIG. 2) is first identified. The third clutch, for instance the rotating clutch C4*, which although not used in the 6-7 upshift, effectively "tags along" at a zero slip speed in region 62.

Thus, as part of the method 100, the rotating clutch C4* of FIG. 1 may be designated as an additional oncoming clutch so as to reduce the required clutch energy on clutch C5710R. That is, in a 6-7 upshift of the example 10-speed transmission 14 of FIG. 2, clutch C4* will realize zero slip speed simultaneously with clutch C5710R. This relationship allows an equal reduction in C5710R energy for each unit of energy absorbed by clutch C4 during the ratio change from $6^{th}$ to $7^{th}$ gear.

Beginning at step 102, method 100 includes providing a preliminary transmission design, e.g., the transmission 14 of FIG. 1. Step 102 may include identifying all of the required gear sets, clutches, input members, and output members of a given transmission. Once the preliminary transmission design is available, the method 100 proceeds to step 104.

Step 104 may include generating a shift table for the preliminary transmission design from step 102, such as the example shift table 60 shown in FIG. 2. Step 104 includes identifying the slip speed ratios with respect to an input member to the transmission for each clutch used in the preliminary transmission design of step 102. The table generated as part of step 104 should be indexed by every available forward and reverse drive state for each clutch. Once the table is complete, the method 100 proceeds to step 106.

Step 106 includes determining, with reference to the shift table from step 104, whether a direct drive or other gear state exists in which three different clutches of the preliminary transmission design from step 102 are simultaneously operating at a zero slip speed ratio with respect to the input member, e.g., the input member 16 of FIG. 1. For example, in FIG. 2 this state is indicated by region 62, wherein the clutches C5710R, C6789, and C4* are simultaneously at zero slip speed. The state may be selected from the shift table. The particular gear may differ from this example depending on the design provided at step 102. However, the identified gear will coincide with a common rotational speed of all nodes used in the transmission. If such a mode does not exist, the method 100 is finished (*). The preliminary design from step 102 may be used without modification. However, if a gear state is identified at step 106 having three clutches that slip at a zero speed ratio, this mode is set aside for use in the subsequent execution of steps 108 and 110.

At step 108, of the three clutches identified at step 106, one clutch is designated as an additional oncoming clutch for application during the shift identified at step 104. The designated additional oncoming clutch is the clutch having a zero slip speed and not otherwise involved in the particular shift. In the example of FIG. 2, that clutch is clutch C4*, which in the 10-speed example transmission 14 of FIG. 1 is engaged or applied only in $4^{th}$ gear. In this manner, C4* may be more accurately referred to as C47 once used in the manner described below with reference to step 110. Thus, clutch C4* must be sized sufficiently to handle torque transfer during a shift into $4^{th}$ gear. However, rotating clutch C5710R, which is typically the sole oncoming clutch for the 6-7 upshift example, can be reduced in size by offloading some of the required energy to the additional oncoming clutch, i.e., clutch C4.

As noted above, for every unit of energy absorbed by the designated additional oncoming clutch, in this instance clutch C4* of FIG. 1, the required clutch energy for the other oncoming clutch, i.e., clutch C5710R, may be reduced. Clutch energy requirements may be split equally between the two oncoming clutches, or shared at a different ratio, e.g., 60-40 as between clutches C5710R and C4*, respectively, in two possible configurations. The actual energy ratio will depend largely on the calibrated torque capacity needed by the additional oncoming clutch, e.g., clutch C4*, in executing its designated function, for example a shift to $4^{th}$ gear.

Step 110 includes constructing the two oncoming clutches, e.g., C5710R and C4*, such that the clutch shift energy is shared as desired between these two clutches. In the example 10-speed configuration shown in FIG. 1, due to the unique location of clutch C4*, this particular clutch may be used to split the clutch energy required to execute a gear ratio change into and out of $7^{th}$ gear, i.e., 6-7 upshift, or alternatively a 7-5 downshift, and, in a possible embodiment, a 7-4 downshift. For the same example, C5710R may act as the holding clutch and C6789 may act as an oncoming clutch without departing from the intended inventive scope. The method 100 is complete (*) upon execution of step 110.

As a result of using the method 100 of FIG. 3, the transmission 14 of FIG. 1 or other suitable transmissions may be designed with reduced spin losses, cost, mass, and reduced packaging size for the dual oncoming clutches identified in step 108, without adversely affecting the performance of the identified additional oncoming clutch, e.g., clutch C4*. For instance, clutch C5710R may be designed with fewer clutch plates, and the reduced spin losses may result in improved fuel economy. Additionally, while a direct drive gear is described in the example embodiment of FIGS. 1 and 2, any state may be used wherein all nodes of all gear sets used rotate at a common speed. As a result, the method 100 is flexible and applicable to other transmission designs.

While the best modes for carrying out the invention have been described in detail, those familiar with the art to which this invention relates will recognize various alternative designs and embodiments for practicing the invention within the scope of the appended claims.

The invention claimed is:
1. A vehicle comprising:
an internal combustion engine; and
a transmission having:
  a plurality of gear sets each having a plurality of nodes, with each node being one of a sun gear, a ring gear, and a planetary carrier of the gear set;
  a plurality of rotating clutches, the application of any two of which results in a direct drive mode wherein all of the nodes rotate at a common speed, including a first rotating clutch that is engaged as an oncoming clutch during execution of a predetermined shift maneuver having a total required clutch energy, and a second rotating clutch that is engaged as a holding clutch during execution of the predetermined shift maneuver, wherein the predetermined shift maneuver is a shift to the direct drive mode;
  a plurality of braking clutches, wherein the plurality of gear sets are selectively connected to and disconnected from each other via actuation of different ones of the rotating and braking clutches, alone or in combination, to thereby establish multiple forward drive states of the transmission;
  an input member connected to the engine and to a node of at least one of the plurality of gear sets; and
  an output member connected to a node of a different one of the plurality gear sets;
wherein the rotating clutches also include a third rotating clutch that, when not engaged, would otherwise have a zero slip speed relative to the input member during the predetermined shift maneuver, and wherein the third clutch is engaged as an additional oncoming clutch during the predetermined shift maneuver to thereby share the total required clutch energy with the first clutch.

2. The vehicle of claim 1, wherein the plurality of gear sets includes a first, a second, a third, and a fourth planetary gear set each having, as one of the plurality of nodes, a first, a second, and a third node, and wherein the transmission is a 10-speed transmission.

3. The vehicle of claim 2, wherein the third rotating clutch selectively connects the third node of the first planetary gear set to the third node of the second planetary gear set.

4. The vehicle of claim 3, wherein the third rotating clutch is otherwise engaged only when shifting the transmission into or out of $4^{th}$ gear.

5. The vehicle of claim 2, wherein the plurality of braking clutches includes exactly four braking clutches and the plurality of rotating clutches includes exactly three rotating clutches.

6. The vehicle of claim 1, wherein the total required clutch energy of the predetermined shift maneuver is shared equally between the first and third rotating clutches.

7. The vehicle of claim 1, wherein at least 40 percent of the total required clutch energy is absorbed by the third clutch.

8. The vehicle of claim 1, wherein the transmission is a 10-speed transmission, and wherein:

the first rotating clutch is engaged in each of $5^{th}$, $7^{th}$, and $10^{th}$ gears and in reverse;

the second rotating clutch is engages in each of $6^{th}$-$9^{th}$ gears; and the third rotating clutch is engaged in $4^{th}$ and $7^{th}$ gears.

9. A transmission comprising:

a plurality of gear sets each having a plurality of nodes, with each node being one of a sun gear, a ring gear, and a planetary carrier of the gear set;

a plurality of rotating clutches, the application of any two of which results in a direct drive mode wherein all of the nodes rotate at a common speed, including a first rotating clutch that is engaged as an oncoming clutch during execution of a predetermined shift maneuver having a total required clutch energy, and a second rotating clutch that is engaged as a holding clutch during execution of the predetermined shift maneuver, wherein the predetermined shift maneuver is a shift to the direct drive mode;

a plurality of braking clutches, wherein the plurality of gear sets are selectively connected to and disconnected from each other via actuation of different ones of the rotating and braking clutches, alone or in combination, to thereby establish multiple forward drive states of the transmission;

an input member connected to a node of at least one of the plurality of gear sets; and an output member connected to a node of a different one of the plurality gear sets;

wherein the rotating clutches also include a third rotating clutch that, when not engaged, has a zero slip speed relative to the input member during the predetermined shift maneuver, and wherein the third clutch is designated as an additional oncoming clutch that is engaged during the predetermined shift maneuver to share the total required clutch energy with the first rotating clutch.

10. The transmission of claim 9, wherein the plurality of gear sets includes a first, second, third, and fourth planetary gear set each having, as one of the plurality of nodes, a first, a second, and a third node, and wherein the transmission is a 10-speed transmission.

11. The transmission of claim 9, wherein the third clutch selectively connects the third node of the first planetary gear set to the third node of the second planetary gear set.

12. The transmission of claim 11, wherein the third clutch is otherwise engaged only when shifting the transmission into or out of $4^{th}$ gear.

13. The transmission of claim 9, wherein the plurality of braking clutches includes four braking clutches and the plurality of rotating clutches includes three rotating clutches.

14. The transmission of claim 9, wherein the total clutch energy of the predetermined shift maneuver is shared equally between the first and third rotating clutches.

15. The transmission of claim 9, wherein the total required clutch energy is shared unequally between the first and third rotating clutches.

16. The transmission of claim 15, wherein at least 60 percent of the total required clutch energy is absorbed by the first rotating clutch.

17. A method comprising:

providing a transmission design having a plurality of gear sets, each having a plurality of nodes, with each node being one of a sun gear, a ring gear, and a planetary carrier, and also having a plurality of rotating clutches, the application of any two of which results in a direct drive mode wherein all of the nodes rotate at a common speed, the plurality of rotating clutches including a first rotating clutch that is engaged as an oncoming clutch during execution of a predetermined shift maneuver having a total required clutch energy, and a second rotating clutch that is engaged as a holding clutch during execution of the predetermined shift maneuver, an input member, and an output member;

building a shift table for the transmission design, including identifying the slip speed ratios, with respect to the input member, for each of the plurality of clutches, wherein the shift table is indexed by every available forward and reverse drive state for each of the rotating clutches and each of the braking clutches;

selecting, from the shift table, a direct drive or other gear state in which three of the rotating clutches are simultaneously operating at a zero slip speed ratio with respect to the input member;

designating a third rotating clutch of the plurality of rotating clutches as an additional oncoming clutch for application during the predetermined shift maneuver, wherein the designated additional oncoming clutch has a zero slip speed and is not otherwise engaged during the predetermined shift maneuver, and wherein the predetermined shift maneuver is a shift to the direct drive mode;

constructing a transmission having the first and third rotating clutches as oncoming clutches for the predetermined shift maneuver; and engaging the third rotating clutch during the predetermined shift maneuver to thereby share the total required clutch energy with the first rotating clutch;

wherein the plurality of gear sets includes a first, a second, a third, and a fourth planetary gear set each having a first, a second, and a third node, and wherein the transmission is a 10-speed transmission.

18. The method of claim 17, wherein the plurality of gear sets includes a first, second, third, and fourth planetary gear set each having, as one of the plurality of nodes, a first, a second, and a third node;

the transmission is a 10-speed transmission; and engaging the third rotating clutch includes selectively connecting the third node of the first planetary gear set to the third node of the second planetary gear set.

19. The method of claim 18, wherein the third rotating clutch is otherwise engaged only when shifting the transmission into or out of $4^{th}$ gear.

* * * * *